(12) United States Patent
Chung

(10) Patent No.: US 9,933,070 B2
(45) Date of Patent: Apr. 3, 2018

(54) COATING METHOD FOR VEHICLE SHIFT FORK AND SHIFT FORK WITH AMORPHOUS COATING LAYER FORMED BY SAME

(71) Applicant: Hyundai Motor Company, Seoul (KR)

(72) Inventor: Min Gyun Chung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 182 days.

(21) Appl. No.: 14/677,116

(22) Filed: Apr. 2, 2015

(65) Prior Publication Data

US 2016/0122857 A1     May 5, 2016

(30) Foreign Application Priority Data

Oct. 31, 2014 (KR) .......................... 10-2014-0149688

(51) Int. Cl.
| | |
|---|---|
| *F16H 63/32* | (2006.01) |
| *B60K 20/00* | (2006.01) |
| *C23C 4/02* | (2006.01) |
| *C23C 4/08* | (2016.01) |
| *C23C 4/129* | (2016.01) |

(52) U.S. Cl.
CPC .............. *F16H 63/32* (2013.01); *C23C 4/02* (2013.01); *C23C 4/08* (2013.01); *C23C 4/129* (2016.01); *F16H 2063/324* (2013.01)

(58) Field of Classification Search
CPC ... F16H 63/32; F16H 2063/324; C23C 4/129; C23C 4/02; C23C 4/08
See application file for complete search history.

(56) References Cited

U.S. PATENT DOCUMENTS

| | | | | |
|---|---|---|---|---|
| 2,904,449 | A | * | 9/1959 | Bradstreet ............... C23C 4/129 191/1 A |
| 4,353,449 | A | * | 10/1982 | Lamy ...................... F16H 63/32 192/82 R |
| 5,120,613 | A | * | 6/1992 | Basler .................... F01D 5/288 427/327 |
| 5,747,163 | A | * | 5/1998 | Douglas ................... C23C 4/06 428/403 |
| 2008/0178700 | A1 | * | 7/2008 | Harmos ................. F16H 63/32 74/473.37 |
| 2012/0126487 | A1 | | 5/2012 | Kennedy et al. | |

FOREIGN PATENT DOCUMENTS

| | | |
|---|---|---|
| JP | 2004-232035 A | 8/2004 |
| JP | 2011-144403 A | 7/2011 |
| KR | 10-0666773 B1 | 1/2007 |
| KR | 10-2009-0038926 A | 4/2009 |
| KR | 10-2010-0075170 A | 7/2010 |
| KR | 10-1414185 B1 | 7/2014 |

* cited by examiner

*Primary Examiner* — Jake Cook
(74) *Attorney, Agent, or Firm* — Mintz Levin Cohn Ferris Glovsky and Popeo, P.C.; Peter F. Corless

(57) ABSTRACT

Provided herein is a coating method for a vehicle shift fork, and the method includes: preparing a Fe—Cr—Mo-based composition such as a powder; pretreating the shift fork by washing a pad part of the shift fork to remove impurities; forming a coating layer on the pad part using the Fe—Cr—Mo-based powder by high velocity oxygen fuel spraying (HVOF) method; and cooling the coating layer at a rate of about $10^6$ to about $10^8$ K/s to form an amorphous coating layer. Further provided are an amorphous coating formed by high velocity oxygen fuel spraying (HVOF) method and a shift fork including the amorphous coating.

5 Claims, 4 Drawing Sheets

PRIOR ART (a)　　　　　　　　(b)　　　　　　　　(c)

COATING METHOD FOR VEHICLE SHIFT FORK AND SHIFT FORK WITH AMORPHOUS COATING LAYER FORMED BY SAME

CROSS-REFERENCE(S) TO RELATED APPLICATION

The present application claims priority to Korean Patent Application No. 10-2014-0149688, filed Oct. 31, 2014, the entire contents of which is incorporated herein for all purposes by this reference.

TECHNICAL FIELD

The present invention relates to a coating method for a vehicle shift fork and a shift fork with an amorphous coating layer formed by the method. In particular, an amorphous coating layer is formed on a pad part of the vehicle shift fork by using high velocity oxygen fuel spraying (HVOF) method, thereby providing the shift fork with the amorphous coating layer.

BACKGROUND

In general, a transmission properly changes driving force of a vehicle depending on driving condition, and it also has a gearing system to drive the vehicle backward because an engine does not counter rotate.

FIG. 1 schematically illustrates a cross-sectional view of an internal structure of a general manual transmission.

As shown in FIG. 1, the general manual transmission has a transmission operating structure to operate the switching state, and the structure includes: a gear lever directly operated by a driver; a shift rail 20 transferring the operating power of the gear lever to a gearshift; and a shift fork 10 operating a synchronizer sleeve 30 by connecting to the shift rail 20. Particularly, the shift fork 10 is fixed to the shift rail 20, and it has a structure of pushing and moving the synchronizer sleeve 30 to the axial direction as being inserted into a groove manufactured on the outer circumference surface of the synchronizer sleeve 30.

The synchronizer sleeve 30 is a component of a synchromesh device that is manufactured to make the gearshift easily geared. When a driver operates the gear lever, the shift fork 10 is operated through the shift rail 20, and then the synchronizer sleeve 30 moves back and forth by the shift fork 10.

Accordingly, as the synchronizer sleeve 30 moves back and forth by the operation of the gear lever, the synchromesh device works as a clutch, performs synchronizing action to make the main shaft and the shifting gear be the same speed by frictional force at the same time, and then connects a driving gear 40 side and a main shaft 50 side to complete shifting.

Herein, the shift fork 10 has a structure that an arm is formed to a semicircle shape and the arm is settled to the outer circumference surface of the synchronizer sleeve 30. Pad parts are installed in both ends of the inside of the arm to make the gear lever easily attached to the synchronizer sleeve 30, when the synchronizer sleeve moves back and forth by the operation of the gear lever.

During a manual transmission, since the shifting gear pushes the synchronizer sleeve 30 rotating at several thousands rpm, loads are concentrated to the pad part of the shift fork 10. Thus, it is necessary to improve wear resistance and low friction lubrication characteristics of a driving part such as the shift fork 10 to improve life time thereof and to provide competitiveness in vehicle fuel efficiency and emission control.

In the related arts, conventional methods for manufacturing a shift fork, for example, a Korean conventional art entitled "Die casting method of shift fork for vehicle, have been introduced. The methods may improve wear resistance and reduce the production cost by forming an aluminum/alumina thick layer (coating layer) on the contact site of the shift fork to the sleeve. However, when forming a coating layer by cold spray coating method, an amorphous coating layer may not be formed sufficiently, and wear resistance and low friction lubrication characteristics may not satisfy standards thereof.

The description provided above as a related art of the present invention is just for helping in understanding the background of the present invention and should not be construed as being included in the related art known by those skilled in the art.

SUMMARY

In a preferred aspect, the present invention provides a coating method for a vehicle shift fork. In particular, the coating method may improve wear resistance of a pad part and maximize low friction characteristic thereof by forming an amorphous coating layer on the pad part of the vehicle shift fork. Also provided is a shift fork with an amorphous coating layer formed by the coating method.

In one aspect, the present invention provides a coating method for a shift fork of a vehicle. The method may include: preparing a Fe—Cr—Mo-based composition such as a Fe—Cr—Mo-based powder; pretreating a shift fork by washing a pad part of the shift fork to remove impurities; forming a coating layer on the pad part where impurities are removed using the prepared Fe—Cr—Mo-based composition by high velocity oxygen fuel (HVOF) spraying method; and cooling the coating layer at a rate of about $10^6$ to about $10^8$ K/s to form an amorphous coating layer.

In the step of preparing the Fe—Cr—Mo-based composition such as a Fe—Cr—Mo-based powder, the method may include: weighing each material containing Fe, Cr and Mo; dissolving each of the weighed materials; cooling and solidifying each of the dissolved materials; and pulverizing each of the cooled materials into a composition, particularly powders having a diameter of about 15 to about 45 μm.

In the step of pretreating the shift fork, the method may further include, before removing impurities from the shift fork, short blast treating the shift fork using alumina powder to make ten point median height (ten point average roughness) (Rz) of the surface of the pad part be about 10 to about 15 μm.

The coating layer may be formed to have a thickness of about 50 to about 125 μm, and the ten point median height (Rz) of the surface of the coating layer may be about 45 μm or less.

According to an exemplary embodiment of the present invention, the shift fork on which an amorphous coating layer is formed may include: a body part configured to be fixed to a shift rail and integrally formed with an arm that is formed in a semicircle shape so as to wrap the outside of a sleeve; and pad parts configured to be linked to the center and insides of both ends of the arm, respectively. In particular, the pad parts may be formed using the Fe—Cr—Mo-based powder by high velocity oxygen fuel spraying (HVOF) method.[

Porosity of the amorphous coating layer may be in a range from about 4 to about 6%, and Vickers Hardness (HV 300 gf) thereof may be in a range from about 600 to about 700.

The diameter of the Fe—Cr—Mo-based powder may be in a range from about 15 to about 45 μm.

The amorphous coating layer may be formed to have a thickness of about 50 to about 125 μm, and ten point median height (Rz) of the surface of the coating layer may be about 45 μm or less, preferably.

Further provided are vehicles that comprise the shift forks manufactured by the methods described herein.

Other aspects of the invention are disclosed infra.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

Figure 1:
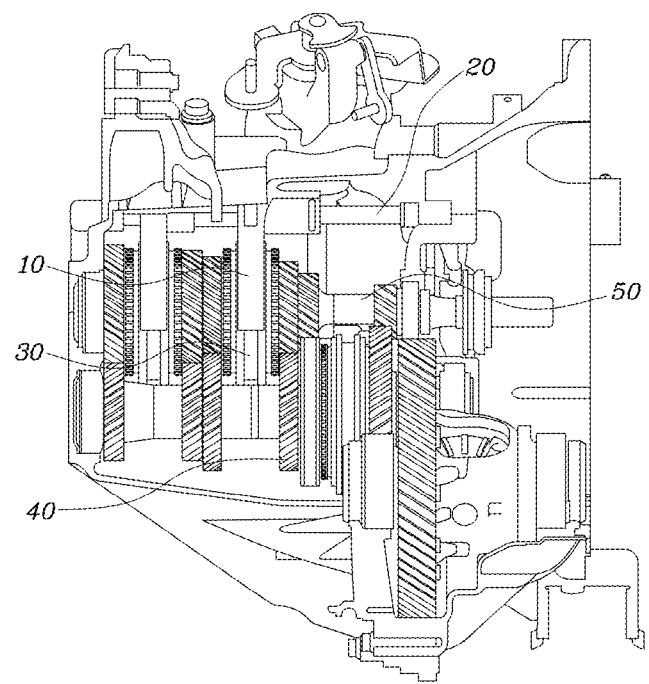
FIG. 1 schematically illustrates a cross-sectional view of an internal structure of a general manual transmission in the related arts.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other embodiments; which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
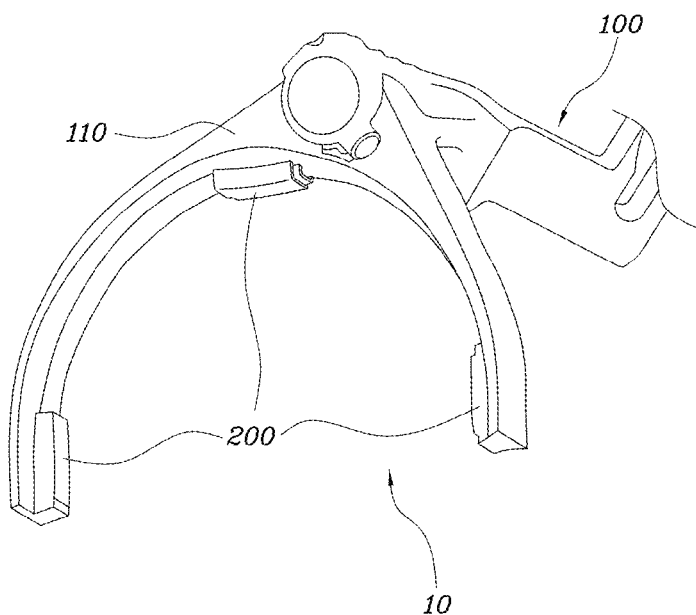
FIG. 2 schematically illustrates a perspective view of an exemplary shift fork according to an exemplary embodiment of the present invention.

FIG. 2 schematically illustrates a perspective view of an exemplary shift fork according to an exemplary embodiment of the present invention.

As shown in FIG. 1 and FIG. 2, the shift fork 10 according to an exemplary embodiment of the present invention may include: a body part 100 configured to be fixed to a shift rail 20 and integrally formed with an arm 110 that is formed to a semicircle shape on one side thereof so as to wrap the outside of a sleeve 30; and pad parts 200 configured to be linked to the center and insides of both ends of the arm 110.

In particular, on the surface of each pad part 200, an amorphous coating layer may be formed using Fe—Cr—Mo-based powder by high velocity oxygen fuel spraying method.

The amorphous coating layer may be a homogeneous alloy without defects such as Grain boundary. Moreover, the amorphous coating layer may improve mechanical properties of a shift fork 10 such as low friction characteristic and wear resistance characteristic and further improve corrosion resistance. Accordingly, durability and life time of the shift fork 10 may be improved.

Figure 3:
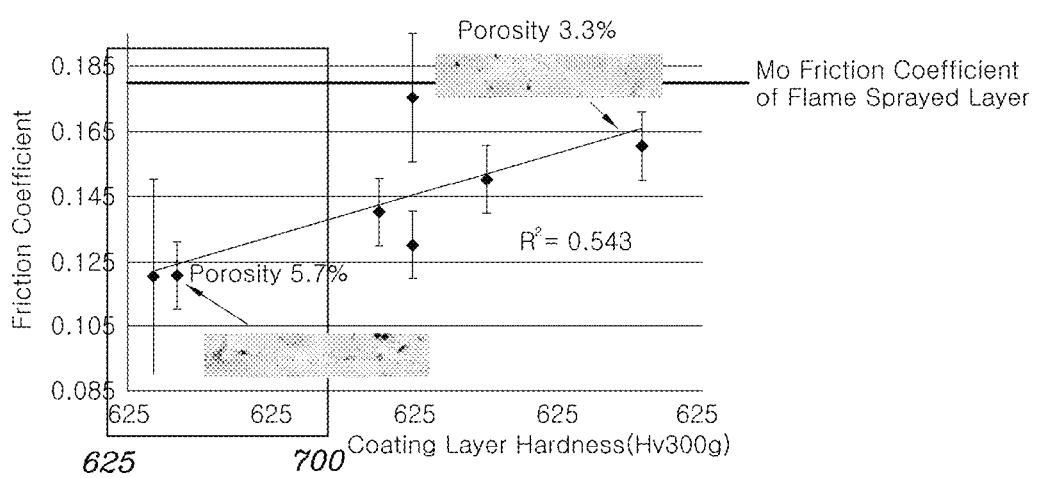
FIG. 3 is an exemplary graph showing correlation between hardness and friction coefficient of an exemplary amorphous coating layer according to an exemplary embodiment of the present invention.

FIG. 3 is an exemplary graph showing correlation between hardness and friction coefficient of an amorphous coating layer according to an exemplary embodiment of the present invention.

As described herein, the hardness is measured 7 times at a load of about 300 gf by using a micro-vickers hardness tester, and then is expressed as an average value excluding the highest value and the lowest value.

At this time, when the hardness of the amorphous coating layer is measured according to an exemplary embodiment of the present invention, as indentation load is increased, indentation area may increase and many pores, micro-cracks and the like present in the amorphous coating layer may be detected together. Because the measured hardness value may indicate mechanical characteristic of the coating layer more effectively than the hardness value measured with low indentation load, in the present invention, the hardness is measured with a load of about 300 gf, which is the maximum load for measuring the material of the present invention.

As shown in FIG. 3, the friction coefficient may be reduced as the hardness value is reduced, because proper amount of pores present on the surface of the coating layer may work as an oil reservoir, thereby improving lubrication characteristic. According to an exemplary embodiment of the present invention, the porosity of the coating layer may be in a range from about 4 to about 6%, and the Vickers Hardness (HV 300 gf) thereof may be in a range from about 600 to about 700. When the porosity of the amorphous coating layer is less than about 4%, lubrication characteristic may not be obtained due to insufficient oil content, and when the porosity is greater than about 6%, strength of the amorphous coating layer may be reduced.

Meanwhile, the amorphous coating layer according to an exemplary embodiment of the present invention may be formed using Fe—Cr—Mo-based powder and the Fe—Cr—Mo-based powder may have a diameter of about 15 to about 45 μm. In particular, the particle size of the Fe—Cr—Mo-based powder may influence on physical properties and yield of the amorphous coating layer. When particles have a diameter of less than about 15 μm, the Fe—Cr—Mo-based powder may bounce off from a base material and not be attached thereto (bounce back phenomenon), thereby reducing coating yield and adhesive strength. When particles have a diameter greater than about 45 μm, lubrication characteristic may be reduced due to the increased surface height of the amorphous coating layer.

Meanwhile, the amorphous coating layer may be formed to a thickness of about 50 to about 125 μm, and ten point median height (Rz) of the surface thereof may be about 45 μm or less.

Figure 4:
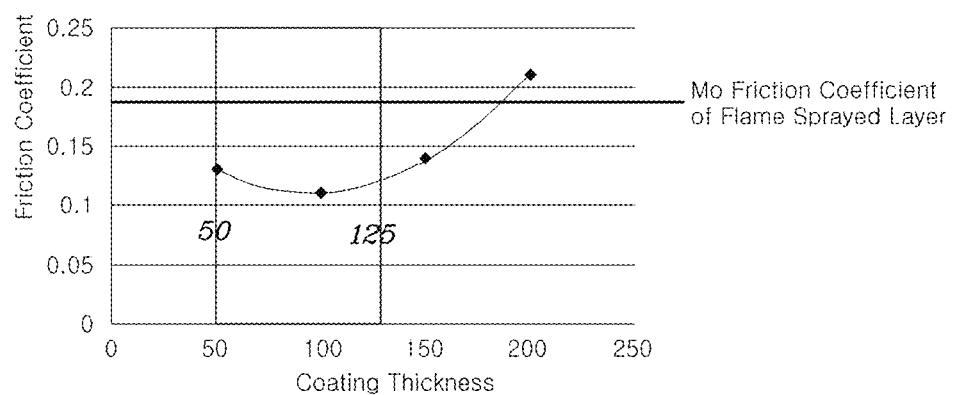
FIG. 4 is an exemplary graph showing correlation between thickness and friction coefficient of an exemplary amorphous coating layer according to an exemplary embodiment of the present invention.

FIG. 4 is an exemplary graph showing correlation between thickness and friction coefficient of an amorphous coating layer according to an exemplary embodiment of the present invention.

As shown in FIG. 4, when the thickness of the amorphous coating layer is less than about 50 μm, durability of the coating layer may be reduced, and when the thickness of the coating layer is greater than about 125 μm, friction coefficient may be sharply increased. Further, when the thickness of the coating layer is greater than about 200 μm, the coating may be brittle due to surface modification of the amorphous coating layer.

The ten point median height (Rz) of the surface of the amorphous coating layer may be about 45 μm or less. When the ten point median height (Rz) is greater than about 45 μm, lubrication characteristic of the amorphous coating layer may be reduced.

Hereinafter, the coating method for a vehicle shift fork according to an exemplary embodiment of the present invention will be described with reference to the accompanying drawings.

According to an exemplary embodiment of the present invention, the coating method for a shift fork may include: preparing Fe—Cr—Mo-based powder; pretreating a shift fork 10 by washing a pad part 200 of the shift fork 10; forming a coating layer; and cooling thereof.

In the step of preparing the Fe—Cr—Mo-based composition such as Fe—Cr—Mo-based powder, the method may include: weighing each material containing Fe, Cr and Mo; dissolving each of the weighed materials; cooling and solidifying each of the dissolved materials; and pulverizing each of the material into powders. As such, the prepared Fe—Cr—Mo-based powder may be used and an exemplary composition of Fe, Cr, Mo and the like are shown in the following Table 1.

TABLE 1

|  | Ingredient | | | | |
| --- | --- | --- | --- | --- | --- |
|  | Fe | Cr | Mo | Si | Others |
| wt % | 57.42 | 28.31 | 11.33 | <2 | <1 |

In particular, the pulverizing step may be conducted after cooling and solidifying the dissolved material and then the materials may be pulverized into particles having a diameter of about 15 to about 45 μm.

When the particles in the Fe—Cr—Mo-based powder have a diameter of less than about 15 μm in the process of forming the coating layer by high velocity oxygen fuel spraying method, bounce back phenomenon may occur such that the powders may bounce off from the pad part and may not be attached thereto, thereby reducing coating yield and adhesive strength. When the particles have a diameter greater than about 45 μm, lubrication characteristic may be reduced due to the increased surface roughness of the amorphous coating layer.

In the step of pretreating the shift fork 10, the method may include: short blast treating the surface of the pad part by using alumina powder; and removing impurities such as dust attached on the surface by washing the pad part 200.

At this time, in the process of short blasting, ten point median height (Rz) of the surface of the pad part 200 may be maintained to a level of about 10 to about 15 μm to improve adhesive strength of the amorphous coating layer, thereby preventing defects such as falling off or detachment.

Further, during removing impurities, impurities such as alumina attached to the surface of the pad part 200 may be removed by short blasting in addition to other impurities on the surface of the pad part 200, thereby further improving adhesive strength of the amorphous coating layer.

In the step of forming the coating layer, the amorphous coating layer may be formed on the surface of the pad part 200, which may be surface-treated by using the Fe—Cr—Mo-based powder by high velocity oxygen fuel spraying (HVOF).

As described herein, spraying rate of the particles sprayed to form the coating layer may influence degree of crystallization of the coating layer. The spay rate of the particles may increase in the order of high velocity oxygen fuel spraying, plasma spraying method and flame spraying method, and formation of the amorphous coating layer may become easier at lower degree of crystallization by high velocity oxygen fuel spraying method. In other words, as the particle spraying rate is increased, the cooling rate may be increased such that amorphous phase fraction may be influenced.

Figure 5:
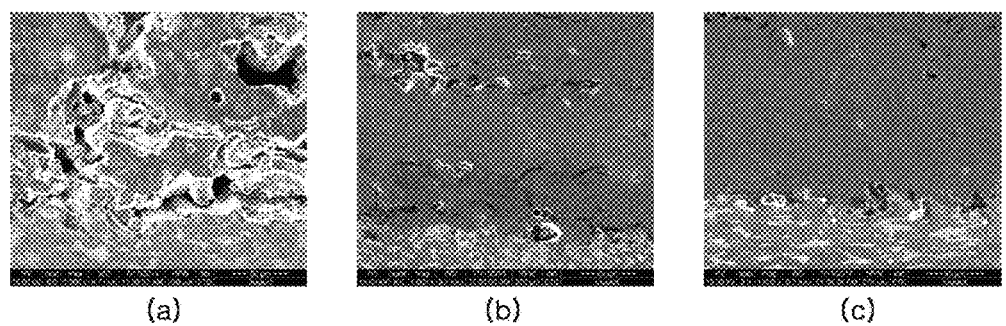
FIG. 5 shows photographs comparing an exemplary coating layer (a) formed by flame spraying method; an exemplary coating layer (b) formed by plasma spraying method; and an exemplary coating layer (c) formed according to an exemplary embodiment of the present invention.
Figure 6:
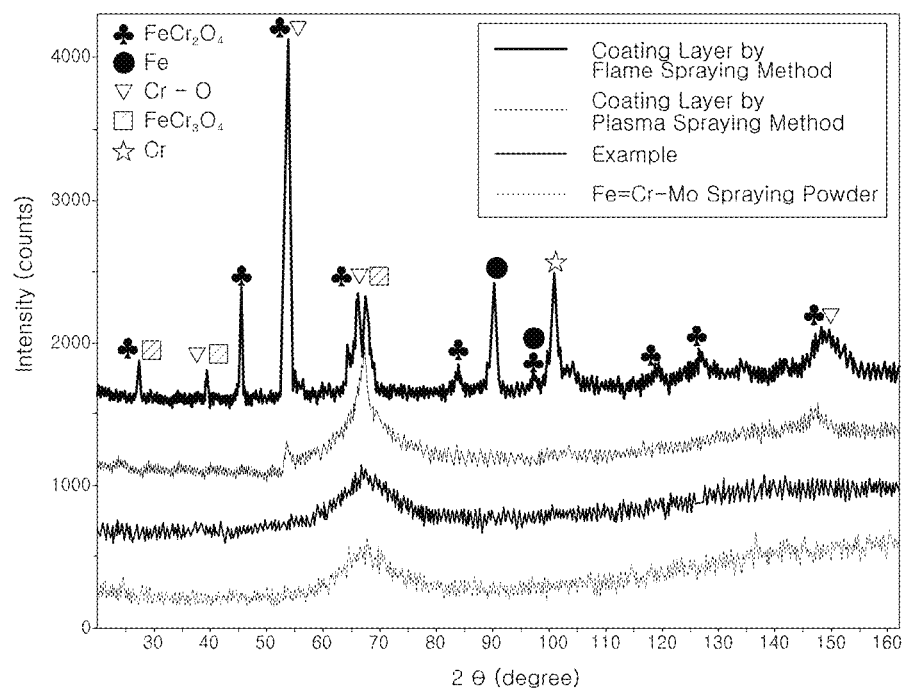
FIG. 6 is an exemplary graph illustrating the results of X-ray Diffraction (XRD) analysis of an exemplary coating layer formed according to an exemplary embodiment of the present invention, a coating layer formed by plasma spraying method and a coating layer formed by flame spraying method.

FIG. 5 shows photographic views of an exemplary coating layer (a) formed by flame spraying method; an exemplary coating layer (b) formed by plasma spraying method;

and an exemplary coating layer (c) formed according to an exemplary embodiment of the present invention. FIG. 6 is an exemplary graph illustrating the results of XRD analysis of an exemplary coating layer formed by flame spraying method; an exemplary coating layer formed by plasma spraying method; and an exemplary coating layer formed according to the present invention.

As shown in FIG. 5 and FIG. 6, from the results of XRD analysis, the coating layer manufactured by high velocity oxygen fuel spraying method may have wide peak shape, and thus, the coating layer may maintain amorphous phase even after coating. However, all coating layers manufactured by plasma spraying method and flame spraying method show crystalline phase peaks, and thus, crystalline coating layers may be formed.

Further, in the step of forming the coating layer according to an exemplary embodiment of the present invention, the coating layer may be formed to have a thickness of about 50 to about 125 μm, and ten point median height (Rz) of the surface thereof may be about 45 μm or less.

As described above, the thickness of about 50 μm may be suitable to secure the minimum durability, which is required to the coating layer manufactured according to an exemplary embodiment of the present invention. When the thickness of the coating layer is greater than about 125 μm, friction coefficient may be sharply increased, and at this time, when the ten point median height (Rz) is greater than about 45 μm, lubrication characteristic of the amorphous coating layer may be reduced.

Further, in the cooling step, the coating layer may be cooled at a rate of about $10^6$ to about $10^8$ K/s to make the coating layer formed on the surface of the pad part 200 be an amorphous coating layer.

As described above, the cooling rate after forming the coating layer may influence an amorphous phase fraction. The coating layer may be cooled at a rate of about $10^6$ to about $10^8$ K/s to maintain amorphous phase after coating. Accordingly, wear resistance and low friction coefficient characteristics may be improved, thereby improving the life time of the shift fork 10 and fuel efficiency of vehicle.

According to various exemplary embodiments of the present invention, by forming an amorphous coating layer on a pad part of a shift fork, wear resistance and low friction coefficient may be improved, and thus, life time of the shift fork and fuel efficiency of vehicle may be improved.

Further, the coating layer may be formed to have porosity of about 4 to about 6%, and pores may work as an oil reservoir, thereby maximizing lubrication characteristic.

The invention has been described in detail with reference to various exemplary embodiments thereof. However, it will be appreciated by those skilled in the art that changes may be made in those embodiments without departing from the principles and spirit of the invention, the scope of which is defined in the appended claims and their equivalents.

What is claimed is:

1. A coating method for a vehicle shift fork, comprising:
   preparing a Fe—Cr—Mo-based composition;
   pretreating the shift fork by washing a pad part of the shift fork to remove impurities;
   forming a coating layer on the pad part where impurities are removed using the prepared Fe—Cr—Mo-based composition by high velocity oxygen fuel spraying (HVOF) method; and
   cooling the coating layer to form an amorphous coating layer,
   wherein the coating layer is formed to have a thickness of about 50 to about 125 μm, and the ten point median height (Rz) of the surface of the coating layer is about 45 μm or less.

2. The coating method of claim 1, wherein Fe—Cr—Mo-based powder is prepared.

3. The coating method of claim 2, wherein in preparing the Fe—Cr—Mo-based powder, the method comprises:
   weighing each material containing Fe, Cr and Mo;
   dissolving each of the weighed materials; and
   cooling and solidifying each of the dissolved materials, and
   pulverizing each of the cooled materials into the powders having a diameter of about 15 to about 45 μm.

4. The coating method of claim 1, wherein, in pretreating the shift fork, the method further comprises short blast treating the shift fork using alumina powder to make the ten point median height (Rz) of the surface of the pad part be about 10 to about 15 μm before removing impurities of the shift fork.

5. The coating method of claim 1, wherein, in cooling the coating layer, the coating layer is cooled at a rate of about $10^6$ to about $10^8$ K/s.

* * * * *